United States Patent [19]

Cibin

[11] Patent Number: 5,366,683
[45] Date of Patent: Nov. 22, 1994

[54] PROCESS FOR MOULDING A LOCKING FASTENER, PRODUCED AS TWO MEMBERS

[75] Inventor: Silvano Cibin, Prato Nuovo, Italy
[73] Assignee: ITW Fastex Italia S.p.A., Turin, Italy
[21] Appl. No.: 61,940
[22] Filed: May 17, 1993
[30] Foreign Application Priority Data
May 15, 1992 [IT] Italy ........................ TO92 A 000420
[51] Int. Cl.$^5$ ...................... B29C 45/32; B29C 45/33; B29C 65/72
[52] U.S. Cl. ..................................... 264/238; 264/242
[58] Field of Search ............... 264/267, 275, 318, 238, 264/255, 242

[56] References Cited

U.S. PATENT DOCUMENTS

| | | | |
|---|---|---|---|
| 4,235,832 | 11/1980 | Leighton | 264/275 |
| 4,282,913 | 8/1981 | Trimmer | 264/267 |
| 4,357,726 | 11/1982 | Trimmer | 264/267 |
| 4,372,905 | 2/1983 | Bohman | 264/318 |
| 4,432,127 | 2/1984 | Diazzi | 264/318 |

Primary Examiner—Jan H. Silbaugh
Assistant Examiner—Angela Ortiz
Attorney, Agent, or Firm—Schwartz & Weinrieb

[57] ABSTRACT

A process for moulding a fastener formed from two members arranged one inside the other, in which the two members are moulded from a fluid plastic material within separate moulding cavities of the same mould with the use of a common cylindrical core so as to form the members separate from one another but facing each other axially. Subsequently, while the members are at a high enough temperature so as to ensure their high deformability, the mould is opened by the movement of respective parts forming the lower die so as to release only the first member, and the subsequent withdrawal of the core causes the insertion of the first member into a through-hole in the second member and, finally the core is withdrawn completely from the fastener. The latter is then expelled from the mould.

7 Claims, 3 Drawing Sheets

PROCESS FOR MOULDING A LOCKING FASTENER, PRODUCED AS TWO MEMBERS

FIELD OF THE INVENTION

The present invention relates to a process for moulding a locking fastener produced as two members.

More particularly, the invention relates to a process for moulding a fastener or a locking element usable for the irreleasable assembly of structural elements, such as petrol pipes, cables and/or other structural elements, on the floorpan of a vehicle having welded, threaded pins projecting therefrom (of the so-called "Tucker" type).

BACKGROUND OF THE INVENTION

Fasteners are known for fixing structural elements irreleasably to a floor which has threaded pins projecting therefrom; these fasteners are constituted essentially by two members, a first for supporting petrol pipelines and/or electrical cables and having a through-hole for its fixation to the threaded pins of the floorpan, and a second member which enables the first member to be press fitted onto the threaded pins, it being inserted in the through-hole and keeping the fastener fixed to the under body.

The two members of the locking fastener of the type described are usually made in a single piece together with a membrane which can be cut or pierced; the second member is then fitted into the through-hole in the first member after the membrane has been cut by a suitable machine and finally they are positioned and fixed to the threaded pins on the floorpan of the vehicle.

The aforenoted process for the production and assembly of the two members of the locking fastener has the disadvantage of requiring the use of a second machine for separating the members and for assembling one member within the other such that to make the entire process is long and expensive.

On the other hand, the formation of the two members as separate parts involves even greater disadvantages in that the members must be positioned correctly relative to each other before assembly.

OBJECT OF THE INVENTION

The object of the invention is to provide a process for moulding a fastener as two members which overcomes the disadvantages described above and which, in particular, enables a single mould to be used to obtain a locking fastener ready for assembly on the floorpan of a vehicle with the members of the fastener already assembled one within the other.

SUMMARY OF THE INVENTION

On the basis of the present invention, there is provided a process for moulding a locking fastener comprising first and second members, the first member being substantially tubular and being housed in a through-hole in the second member, characterised in that it comprises the steps of:

moulding the first and second members from a fluid synthetic plastic material within separate moulding cavities of the same mould so that the first and second members are formed separate from one another, the two members being formed on a common core so that the first member is formed facing and exactly coaxial with the through-hole formed in the second member;

opening the mould immediately after the moulding step and, while the first and second members are at a high enough temperature to ensure their high deformability, moving an upper die away from a corresponding, facing die formed in at least two distinct parts each of which has a moulding cavity for one of the members;

displacing the two parts of the lower die relative to each other so as to cause the first member to be withdrawn from its moulding cavity while, at the same time, the second member is held in its moulding cavity;

withdrawing the core from the through-hole in the second member from the end opposite that facing the first member so as to cause the latter to be inserted in the through-hole;

extracting the core from the first member and expelling the second member, containing the first member, within its through-hole, from the lower die.

BRIEF DESCRIPTION OF THE DRAWINGS

For a better understanding of the invention, a non-limiting description of one embodiment thereof is now given with reference to the appended drawings, in which like reference characters designate like or corresponding parts throughout the several views, and wherein.

DETAILED DESCRIPTION OF THE INVENTION

Figure 1:
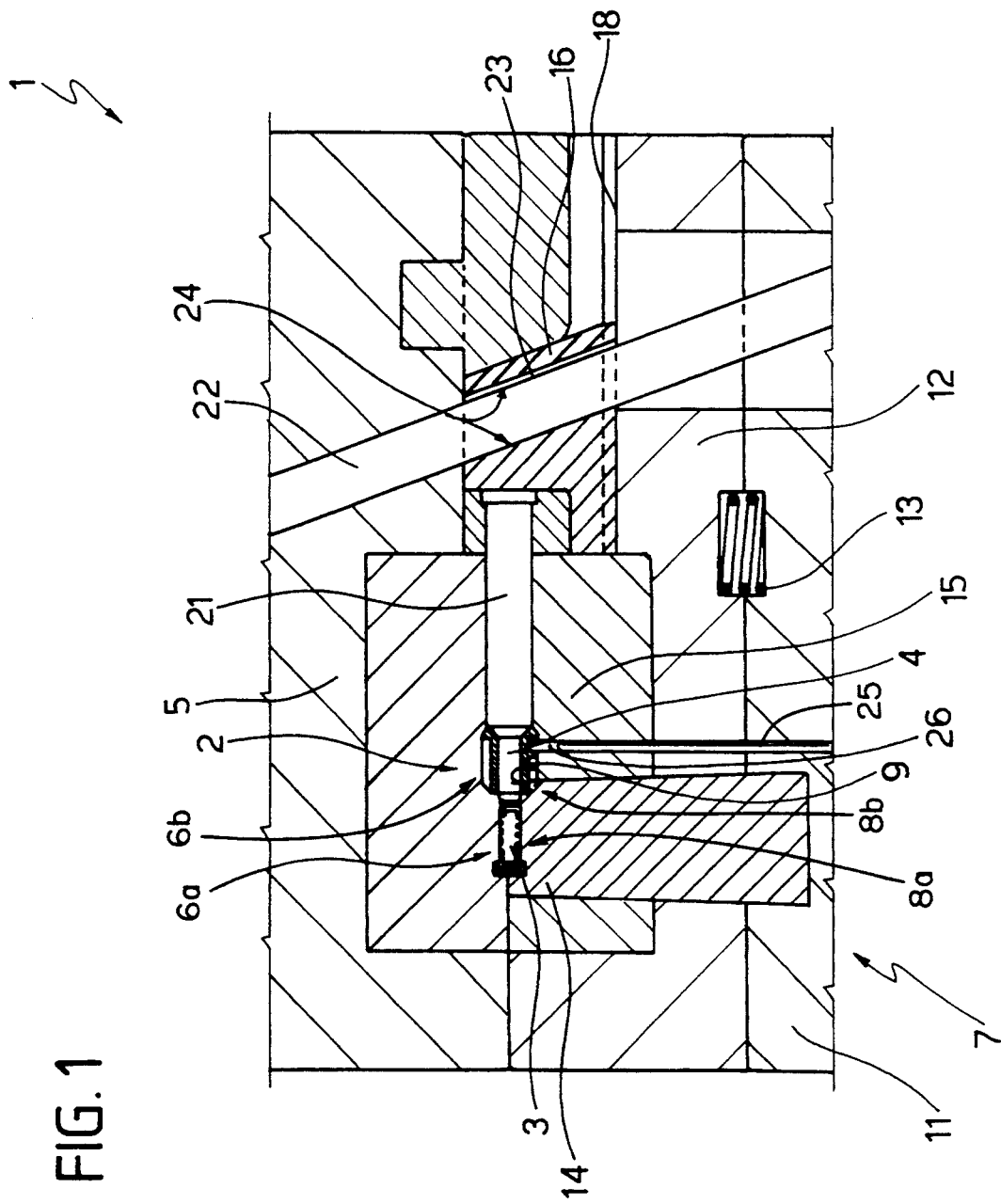
FIG. 1 illustrates a first step in the process of moulding a locking fastener produced as two members, according to the present invention.
Figure 2:
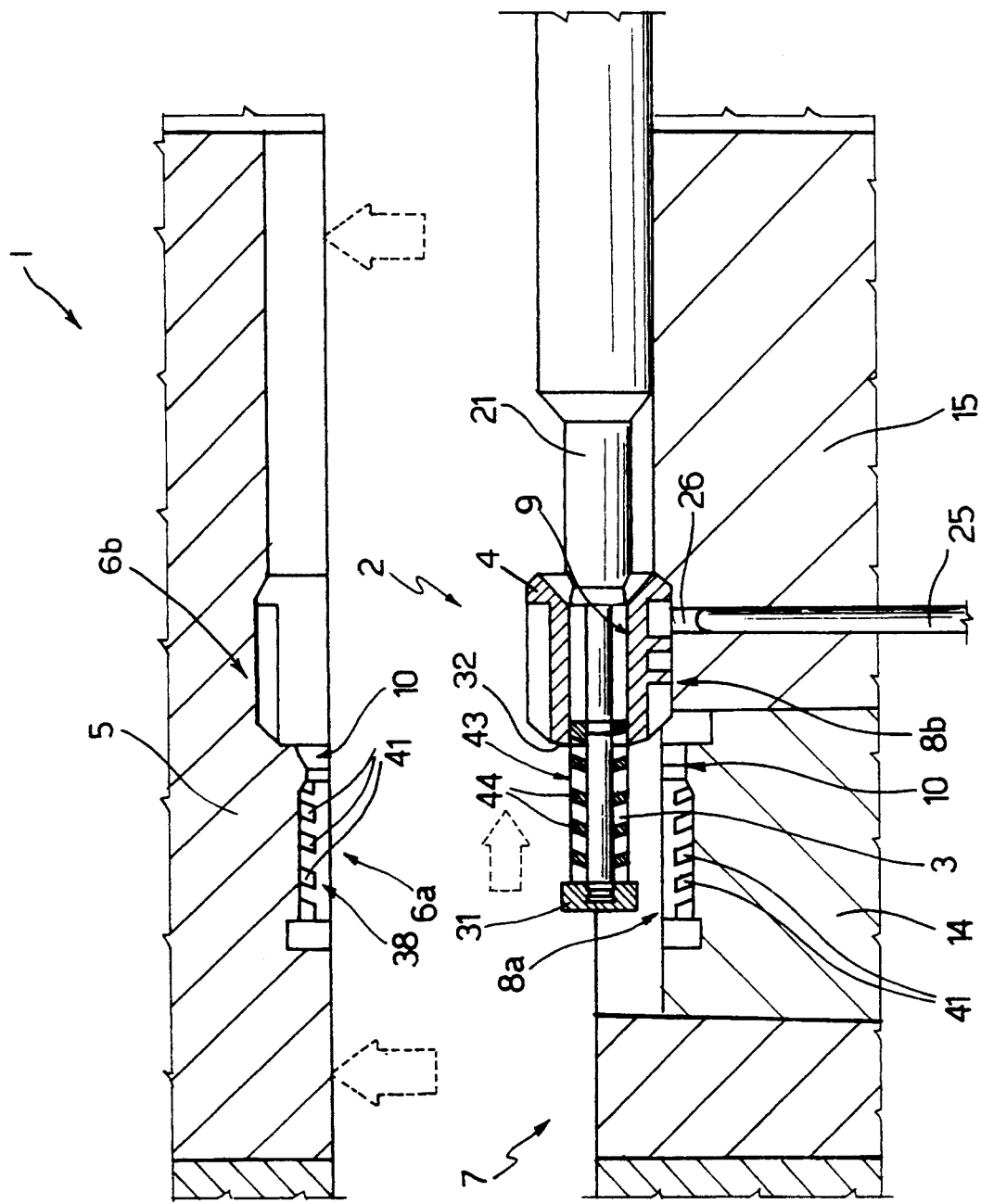
FIG. 2 illustrates a second step in the process, after that illustrated in FIG. 1.
Figure 3:
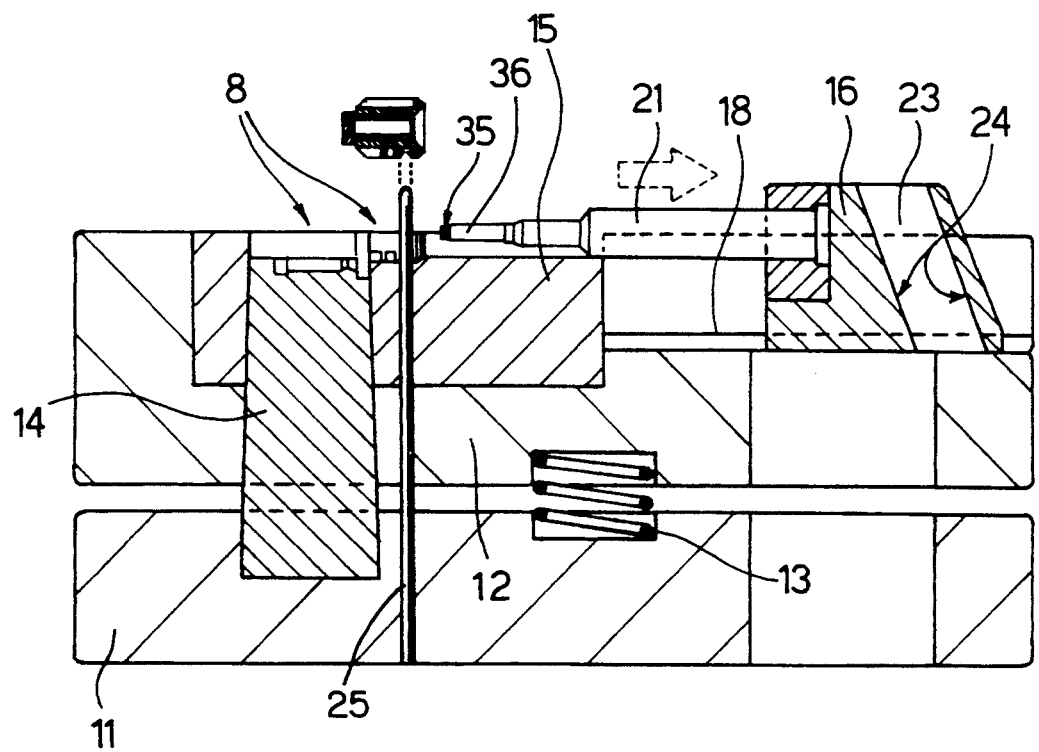
FIG. 3 illustrates a further step in the process illustrated in FIGS. 1 and 2.

With reference to FIGS. 1 to 3, a mould is shown as generally indicated by the reference character 1 for the production of a locking fastener generally indicated at 2 and constituted essentially by two members 3 and 4, the first member 3 being substantially tubular and such that it can be housed in a through-hole 9 in the second member 4. The fastener 2 is, for example, used for fixing and supporting petrol pipelines and/or cables to a vehicle floorpan, known but not illustrated in the appended drawings for simplicity, wherein the floorpan has respective attachment pins, also known and not illustrated in the appended drawings, on which the member 3 can be press fitted.

The mould 1 is constituted essentially by an upper die 5 formed with a first pair of moulding cavities 6a and 6b and a lower die 7 formed with a second pair of moulding cavities 8a and 8b complementary to the first pair of cavities 6a and 6b. Cavities 6a and 8a are physically separated from the cavities 6b and 8b when the mould 1 is closed in that respective connecting spaces 10 between them are closed in use by a removable core 21 which also forms part of the mould 1.

The lower die 7 includes a base 11 and an element 12 movable relative to the base 11 and attached thereto, for example, in the embodiment illustrated in FIGS. 1 and 3, by a spring 13, and the pair of cavities 8a and 8b are thus formed partly in a portion 14 of the lower die 7 fixed to the base 11 (cavity 8a corresponding to the first member 3 of the fastener 2) and partly in a portion 15 of the element 12 of the die 7 (cavity 8b facing the portion 14 and corresponding to the second member 4 of the fastener 2).

The lower die 7 is equipped with a dolly 16 movable along a guide 18 fixed to the element 12 laterally of the portion 15 and from which the core 21, which is substantially cylindrical, projects in use so as to define, together with the pairs of cavities 6a and 6b, and 8a and 8b, the spaces for the formation of the two members 3 and 4 of the fastener 2.

The movement of the dolly 16 along the guide 18 is driven by a lever 22 inclined to the guide 18 itself, fixed to the upper die 5 and engaged with clearance in a smooth through-hole 23 formed in the dolly 16.

The lower die 7, in addition to the dolly 16, is also provided with at least one ejector pin 25 slidable in a seat 26 communicating with the die cavity 8b and movable relative to the die 7 itself so as to expel the fastener 2 once the moulding operations have been finished.

According to the present invention, the process for the moulding of the locking fastener 2 includes a first step in which the members 3 and 4 are moulded in the same mould 1, in which step a synthetic plastic material in the fluid state, not illustrated in the drawings for simplicity, is injected through a known injection duct, not illustrated for simplicity, into the mould 1 so that the first member 3 and the second member 4 are formed in the same mould, separate from one another and joined only by the core 21, with the first member 3 formed exactly facing and coaxial with the through-hole in the second member 4 of the fastener 2.

Immediately after the moulding step, the mould 1 is opened and, while the members 3 and 4 are still at a sufficiently high temperature to ensure their high deformability, the upper die 5 is moved away from the lower die 7 with the consequent movement of the base 11 relative to the element 12 of the lower die 7 by means of the action of the spring 13 so as to cause the first member 3 of the fastener 2 to be withdrawn from its moulding cavities 6a and 8a while the second member 4 is simultaneously held in its cavities 6b and 8b.

Subsequently, as the upper die 5 is moved away from the lower die 7, the action of the control lever 22 on respective peripheral walls 24 of the through-hole 23 in the dolly 16 causes the dolly 16 itself and the core 21 to move, with the progressive withdrawal of the core 21 from the through-hole 9 in the second member 4 of the fastener 2 and the progressive introduction of the first member 3 into the through-hole 9 itself from the opposite end.

Finally, the core 21 is withdrawn completely from the interior of the first member 3 and the assembled fastener 2 is then expelled from the lower die 7 by the action of the ejector pin 25.

Figure 4:
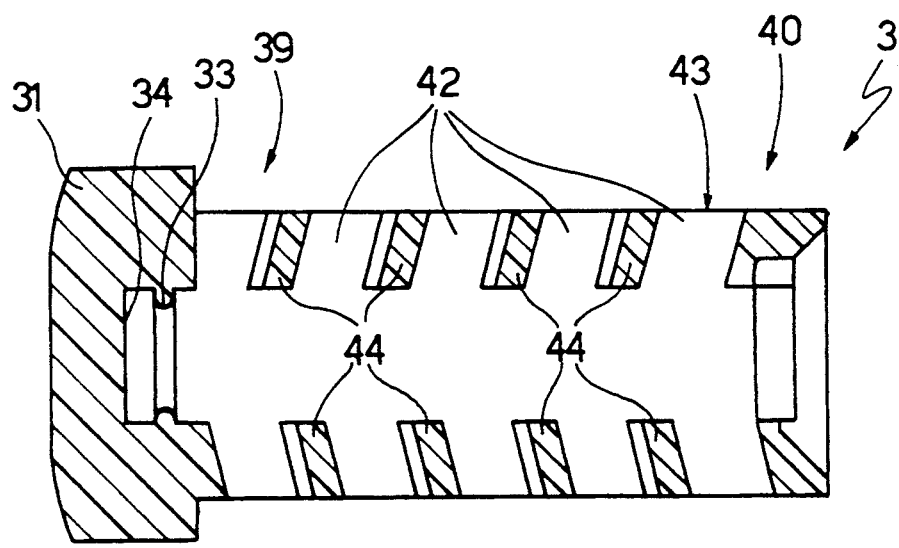
FIG. 4 illustrates a detail of a member of a locking fastener obtained by the process of the invention in longitudinal section and on an enlarged scale.

More particularly, with reference to FIG. 4, the first member 3 of the fastener 2 is formed with an outer gripper head 31 located at one end 39 of the member 3 opposite an end 40 thereof facing the core 21. The gripper head 31 is adapted to come to bear against a corresponding mouth portion 32 of the second member 4 surrounding the through-hole 9 and has an internal annular projection 33 formed within a cavity 34 in the head itself arranged to engage a corresponding annular groove 35 formed in an end portion 36 of the core 21. The annular projection 33 is disengaged therefrom by resilient deformation in the step in which the core 21 is withdrawn from the fastener 2.

In accordance with the present invention, the moulding cavities 6a and 8a have respective teeth 41 for forming corresponding slots 42 in a peripheral wall 43 of the first member 3, which slots between them define respective inclined tongues 44 on the latter which, during separation of the dies 5 and 7, disengage from the teeth 41 by resilient deformation in a manner similar to the disengagement of the annular projection 33.

When the mould 1 is closed, it has the configuration illustrated in FIG. 1: the cavities 6a and 8a, 6b and 8b are face-to-face with the core 21 inserted between them and occupying the space 10 completely; thus two moulding spaces, separated from each other and shaped exactly like the two members 3 and 4 it is wished to obtain are defined within the mould.

The injection of a fluid synthetic plastics material enables the members 3 and 4 to be obtained as two members which are entirely separate but engaged axially on the common core 21.

In the subsequent step (FIG. 2), when the mould 1 is opened and the upper die 5 is moved away from the lower die 7, the movement of the base 11 relative to the element 12 of the latter causes the member 3 to be liberated completely from its mould cavities 6a and 8a; the member 3 however remains immovable since it is supported by the end 36 of the core 21 on which it is clamped axially by the engagement of the annular projection 33 in the corresponding groove 35.

During this step, the member 3 can leave its moulding cavities 6a and 8a in the dies 5 and 7 notwithstanding the presence of the undercut formations due to the teeth 41, by the elastic rotation of the tongues 44.

The withdrawing movement of the core 21, with its progressive extraction from the through-hole 9 in the member 4, thus causes the simultaneous introduction of the member 3 into the member 4 from the opposite end.

When the head 31 comes to bear against the member 4, the axial movement of the member 3 is stopped (the member 4 cannot move axially since it is still engaged in the cavity 8b) and hence the further withdrawal of the core 21 causes the resilient deformation of the annular projection 33 and thus enables the end 36 of the core 21 to be withdrawn completely from the member 3. At this point, the action of the ejector pin 25 causes the pre-assembled fastener 2 to be expelled from the mould 1 so as to be ready for its final assembly on the vehicle.

The advantages of the present invention will be clear from the above; the moulding process described enables the two members constituting the locking fastener to be made in a single mould and with a single machine, the two members being formed being subsequently inserted one in the other and ready for assembly on the floorpan of the vehicle; and the costly use of further machines for fitting the two elements together is thus avoided.

Finally, the operation of assembling the two members does not add to the cycle time for the moulding operation, the members being assembled in conjunction with the opening movements of the parts of the mould.

Obviously, many modifications and variations of the present invention are possible in light of the above teachings. It is therefore to be understood that within the scope of the appended claims, the present invention may be practiced otherwise than as specifically described herein.

I claim:

1. A process for moulding and assembling a locking fastener (2), comprising a first member (3) and a second member (4), said first member (3) being substantially tubular and adapted to be housed within a through-hole (9) defined within said second member (4), comprising the steps of:

moulding said first (3) and second (4) members from a plastic material within separate moulding cavities (6a,8a and 6b,8b) defined within the same mould (1) so that said first (3) and second (4) members are formed separate from each other, said two members (3 and 4) being formed upon a common core (21) so that said first member (3) is formed facing and coaxial with said through-hole (9) defined within said second member (4);

opening said mould (1) by moving one moulding die (5) away from a second moulding die (7) which is formed in at least two distinct parts (11 and 12) and wherein each one of said two distinct parts (11 and 12) has a moulding cavity (8a and 8b) for moulding one of said members (3 and 4);

displacing said two parts (11 and 12) of said second die (7) relative to each other so as to cause said first member (3) to be withdrawn from its moulding cavity (8a) while at the same time said second member (4) is retained within its moulding cavity (8b);

withdrawing said core (21) from said through-hole (9) defined within said second member (4) from the end disposed opposite that end facing said first member (3), while said second member (4) is retained within its mould cavity (8b) by being disposed in contact with at least one wall of said mould cavity (8b), so as to cause said first member (3) to be inserted into said through-hole (9) of said second member (4);

extracting said core (21) from said first member (3) after said first member (3) is disposed within said second member (4); and expelling said second member (4), containing said first member (3) within said through-hole (9), from said moulding cavity (8b) of said second moulding die (7).

2. A process as claimed in claim 1, characterised in that, during the moulding step, the first member (3) is formed with an outer shoulder portion member (31) adapted to abut a mouth portion (32) of the second member (4) surrounding the through-hole (9), and with flexible means (33) for axial engagement with a respective end portion (36) of the core (21) arranged inside the first member (3).

3. A process as claimed in claim 2, characterised in that the outer shoulder portion (31) is formed as a gripper head (31) on an end of the first member (3) opposite the end facing the second member (4); said axial engagement means (33) comprising an annular projection (33) formed inside a recess (34) in the gripper head (31) and engaging a corresponding annular groove (35) in the end portion (36) of the core (21), the annular projection (33) disengaging therefrom by elastic deformation.

4. A process as claimed in claim 1, characterised in that said core (21) is constituted by a cylindrical member fixed to a dolly (16) which is movable on the second die (7) parallel thereto and engaged by an inclined control member (22) fixed to the one die (5) so as to project therefrom, the control member being arranged to drive the sliding of the dolly (16) as a consequence of the movement apart of the dies (5 and 7) so as to move the core (21) away from the moulding cavities (6a, 6b and 8a, 8b).

5. A process as claimed in claim 1, characterised in that the moulding cavities (6a and 8a) for the first member (3) have respective teeth (41) for forming corresponding slots (42) in a side wall (43) of the first member (3), the slots (42) defining between them respective inclined tongues (44) on said side wall (43); these inclined tongues (44) disengaging from the teeth (41) upon movement apart of the dies (5 and 7) by elastic deformation of the tongues (44).

6. A process for molding and assembling a locking fastener (2), comprising a first member (3) and a second member (4), said first member (3) being substantially tubular and adapted to be housed within a through-bore (9) defined within said second member (4), comprising the steps of:

molding said first (3) and second (4) members from a plastic material within separate molding cavities (6a,8a and 6b,8b) defined within the same mold (1) so that said first (3) and second (4) members are formed separate from each other, said two members (3 and 4) being formed upon a common core (21) so that said first member (3) is formed facing, and is coaxial with, said through-bore (9) defined within said second member (4);

opening said mold (1) by relatively moving a first molding die (5) away from a second molding die (7) such that said first member (3) is withdrawn from its molding cavity (6a,8a) while at the same time said second member (4) is retained within its molding cavity (8b);

withdrawing said core (21) from said through-bore (9) defined within said second member (4), from the end of said second member (4) which is disposed opposite the end of said second member (4) which faces said first member (3), by moving said core (21) in a first direction with respect to said second member (4) and while said second member (4) is retained within its mold cavity (8b) by being disposed in contact with at least one wall of said mold cavity (8b) so as to cause said first member (3) to be inserted into said through-bore (9) of said second member (4);

extracting said core (21) from said first member (3), after said first member (3) has been completely inserted into said through-bore (9) of said second member (4), by continuing the movement of said core (21) in said first direction with respect to said second member (4); and expelling said second member (4), containing said first member (3) within said through-bore (9) of said second member (4), from said molding cavity (8b) of said second molding die (7).

7. The process as set forth in claim 6, wherein:

an end portion (36) of said core (21) is provided with an annular groove (35); and said first member (3) is provided with a gripper head (31) at an axial position which is remote from said second member (4), said gripper head (31) having an internal, annular projection (33) for disposition within said annular groove (35) of said end portion (36) of said core (21), whereupon initial movement of said core (21) in said first direction with respect to said second member (4), said first member (3) will be inserted into said second member (4) until said gripper head (31) of said first member (3) abuts a mouth portion (32) of said second member (4) at which time said first member (3) is completely inserted into said through-bore (9) of said second member (4), and upon further movement of said core (21) in said first direction with respect to said second member (4), said end portion (36) of said core (21) will separate from said first member (3) as a result of disengagement of said annular projection (33) of said gripper head (31) of said first member (3) from said annular groove (35) of said end portion (36) of said core (21).

* * * * *